T. E. MURRAY.
METHOD OF LOCALIZING AND ELIMINATING IMPERFECTIONS IN ELECTRICALLY WELDED JOINTS.
APPLICATION FILED NOV. 1, 1917.
1,252,290. Patented Jan. 1, 1918.
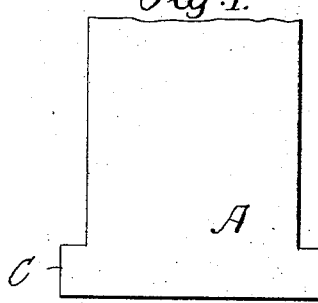
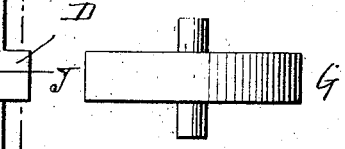
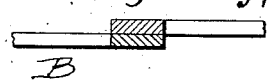
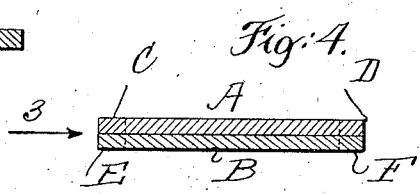
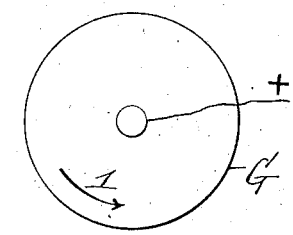
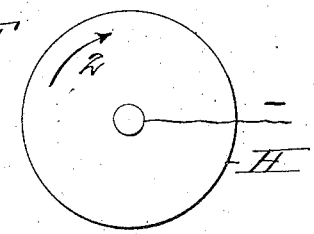
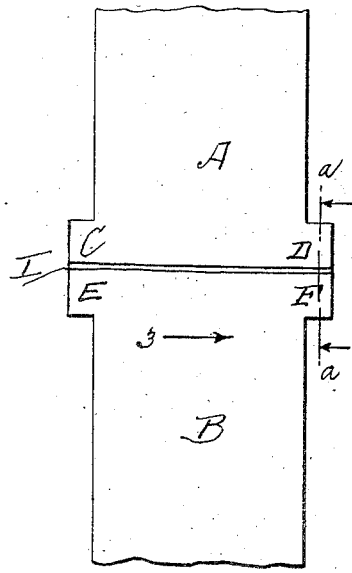
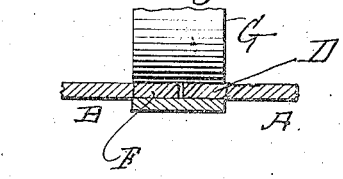
INVENTOR
Thomas E. Murray
BY
ATTORNEY

UNITED STATES PATENT OFFICE.

THOMAS E. MURRAY, OF NEW YORK, N. Y.

METHOD OF LOCALIZING AND ELIMINATING IMPERFECTIONS IN ELECTRICALLY-WELDED JOINTS.

1,252,290.

Specification of Letters Patent.

Patented Jan. 1, 1918.

Application filed November 1, 1917. Serial No. 199,775.

*To all whom it may concern:*

Be it known that I, THOMAS E. MURRAY, a citizen of the United States, residing at New York, in the county of New York and State of New York, have invented a certain new and useful Improvement in Methods of Localizing and Eliminating Imperfections in Electrically-Welded Joints, of which the following is a specification.

The invention is a method of localizing and eliminating imperfections in an electrically welded joint, due to make and break of the welding current.

In the accompanying drawings—

Figure 1 is a plan view of the end portion of one of the plates to be welded together. Fig. 2 is a similar plan view of the two plates to be welded together, placed with the side projections at their extremities overlapping, and also of one of the roller electrodes. Fig. 3 is a section on the line $x, x$ of Fig. 2. Fig. 4 is a section on the line $y, y$ of Fig. 2, before the plates are united, the roller electrodes being shown in elevation. Fig. 5 is a section on the line $y, y$ of Fig. 2, after the plates are united and the side projections on the extremities of said plates, wherein the imperfections hereafter described are localized, have been removed. Fig. 6 is a plan view of two plates having the side projections, as before, placed so as to overlap a third narrow plate, to which narrow plate said first-named plates are to be welded. This view also shows one of the roller electrodes. Fig. 7 is a section on the line $a, a$ of Fig. 6.

Similar letters of reference indicate like parts.

A and B are two plates to be welded together. Upon each plate are formed side projections—C and D on plate A, and E and F on plate B. G and H are roller electrodes, supported in any suitable fixed bearings and rotatable by any suitable means in the direction of the arrows 1, 2 in Fig. 4.

The operation is as follows:

The plates A, B having their projections overlapping one another, as shown in Figs. 2 and 4, are caused to enter between the roller electrodes G and H, and to pass between said electrodes in the direction of the arrow 3, so that a welded joint is made over a transverse path including said projections. When the projections D, F enter between the electrodes G, H, the establishment of the welding current causes sparking, which again happens when the current is interrupted by the movement of the projections C, E from between said electrodes. By reason of this sparking, the metal of the projections for certain short distances from their edges inward becomes burned, and the joint rendered imperfect at its ends. After the welded plates are removed, said projections are cut off, as shown in Fig. 5, thus doing away with the imperfect joint ends. The width of the plates at the joint will then equal the normal width of said plates elsewhere, and the weld will be perfect from end to end of said joint.

The heating effect of the current is to be such as that the plates will be rendered progressively plastic as they travel between the electrodes, which may be caused to compress and condense the metal of said plates between them, so that the thickness of the metal at the joint is less than the thickness of the overlapped plates, as will be seen by comparing Fig. 4, which shows the plates before welding, with Fig. 5 which shows them afterward, and as compressed and condensed to a less thickness.

The plates A and B may be separate plates, or they may be the end portions of a single plate bent so as to produce the overlapping at the extremities.

Instead of causing the plates having the projections C, D and E, F to overlap one another as just described, I may cause them to overlap a narrow third plate I, as shown in Fig. 6. In this case, the imperfections above described will be localized in said projections and in the ends of the third plate I, upon which they rest. The projections and so much of the third plate I as is welded to them will then be removed.

I claim:

1. The method of localizing and eliminating imperfections in a welded joint between plates, due to make and break of the welding current, which consists in providing upon one of said plates lateral projections, placing said plates in contact, causing said plates to travel and simultaneously to be pressed between electrodes over a path including said projections, and finally removing said projections and the portions of the juxtaposed plate which have become welded thereto.

2. The method of localizing and eliminating imperfections in a welded joint between plates, due to make and break of the welding current, which consists in providing upon the plates to be welded lateral projections, placing said plates in contact with said lateral projections overlapping one another, causing said plates to travel between electrodes over a path including said projections, and finally removing said projections from said plates.

In testimony whereof I have affixed my signature in presence of two witnesses.

THOMAS E. MURRAY.

Witnesses:
GERTRUDE T. PORTER,
MAY T. McGARRY.